United States Patent [19]

Burns et al.

[11] Patent Number: 5,038,727
[45] Date of Patent: Aug. 13, 1991

[54] ENGINE BALANCING SYSTEM HAVING FREELY ROTATABLE SINGLE COUNTERBALANCE WEIGHT

[75] Inventors: Roger Burns, Wauwatosa; Donald T. Szopinski, Hartland, both of Wis.

[73] Assignee: Briggs & Stratton Corporation, Wauwatosa, Wis.

[21] Appl. No.: 639,520

[22] Filed: Jan. 10, 1991

[51] Int. Cl.$^5$ ............................................. F02B 75/06
[52] U.S. Cl. ................................. 123/172 B; 74/603
[58] Field of Search ............... 123/90.31, 192 B; 74/591, 594.5, 603, 604

[56] References Cited

U.S. PATENT DOCUMENTS

| | | | |
|---|---|---|---|
| 3,106,195 | 10/1963 | Hanley | 123/90 |
| 3,203,274 | 8/1965 | Barth et al. | 74/604 |
| 4,004,469 | 1/1977 | Kosugi | 74/604 |
| 4,628,876 | 12/1986 | Fujikawa et al. | 123/192 |
| 4,632,072 | 12/1986 | Brogdon | 123/56 |
| 4,800,852 | 1/1989 | Kandler | 123/192 B |

FOREIGN PATENT DOCUMENTS

| | | | |
|---|---|---|---|
| 61-79039 | 4/1986 | Japan | 74/604 |
| 1001077 | 8/1965 | United Kingdom | 123/192 B |

Primary Examiner—Noah P. Kamen
Attorney, Agent, or Firm—Andrus, Sceales, Starke & Sawall

[57] ABSTRACT

A balancing system for both horizontal and vertical shaft engines has a drive gear attached to the crankshaft, a driven gear disposed on and freely rotatable from the camshaft, and a counterbalance weight attached to the driven gear. The rotation of the crankshaft and the drive gear causes the driven gear and the counterbalance weight to rotate at crankshaft speed and in the opposite direction from the crankshaft. Substantial cost savings are achieved since the balancing system does not require any additional shafts and minimizes the number of gears needed to achieve balancing.

14 Claims, 2 Drawing Sheets

ENGINE BALANCING SYSTEM HAVING FREELY ROTATABLE SINGLE COUNTERBALANCE WEIGHT

BACKGROUND OF THE INVENTION

This invention relates to internal combustion engines, and more particularly to balancing systems for such engines.

Balancing systems for internal combustion engines are used to balance the reciprocating forces due to piston movement and the rotational forces due to crankshaft and crank pin rotation. Many systems are known for counterbalancing these reciprocal and rotational forces. Typical balancing systems use one or more additional balancing shafts, with each additional shaft having a gear that meshingly engages a gear on another shaft, on the crankshaft, or on a shaft attached to the crankcase. Counterbalance weights rotate with the rotation of the additional shaft to balance the reciprocating and rotational forces.

The use of additional shafts, gears and counterweights in such prior art devices increases the cost of the balancing system by fifty per cent or more, and therefore increases the cost of the entire engine.

Many prior art balancing systems use one or more counterbalance weights which rotate at a speed other than the speed of the crankshaft. For example, such counterbalance weights may rotate at camshaft speed, which is typically one-half that of the crankshaft rotation speed. Since the balancing system is designed to balance the crankshaft rotational forces, a counterbalance weight that rotates at any speed other than crankshaft speed typically does not optimally balance the crankshaft rotational forces.

SUMMARY OF THE INVENTION

A balancing system for an internal combustion engine is disclosed for counterbalancing the forces due to piston reciprocation and due to crankshaft rotation. In a preferred embodiment, the counterbalancing means includes a drive gear disposed on and attached to the crankshaft that rotates with the crankshaft. The drive gear meshingly engages a driven gear that is disposed on the camshaft, but is freely and independently rotatable from the camshaft. A single counterbalance weight is preferably integral with the driven gear and rotates with the driven gear so that the counterbalance weight is also independently rotatable from the camshaft. A frictionreducing member such as a material containing Teflon or a metal alloy bushing is attached to the driven gear and substantially encircles the camshaft to provide a low friction surface.

The counterbalance weight may substantially encircle a portion of the camshaft and rotates about the camshaft, although independently of camshaft rotation. In another embodiment, the counterbalance weight rotates about a camshaft boss that extends from the crankcase side wall and that accepts one end of the camshaft. The counterbalance weight is preferably crescent-shaped.

The balancing system operates in the following manner. A timing gear affixed to the crankshaft meshes with a cam gear on the camshaft. Rotation of the crankshaft rotates the timing gear as well as the drive gear, which is preferably formed integral with the timing gear. Since the driven gear meshingly engages the drive gear and is freely rotatable with respect to the camshaft, the rotation of the drive gear also rotates the driven gear at crankshaft speed. The counterbalance weight attached to the driven gear also rotates at crankshaft speed and rotates independently from the camshaft. However, both the driven gear and the counterbalance weight rotate in the opposite direction from the drive gear and the timing gear. The rotation of the counterbalance weight at the same speed and in the opposite direction from the crankshaft results in effective balancing of the vibrational forces.

The balancing system according to the present invention requires a minimum number of parts since extra gears are minimized and additional shafts are eliminated. Thus, the present balancing system results in a substantial savings in parts and assembly costs over prior art balancing systems.

Another feature and advantage of the present invention is that it may be used with both horizontal shaft and vertical shaft engines without major modifications to the balancing system.

These and other features and advantages of the present invention will be apparent to those skilled in the art from the following detailed description of preferred embodiments and the drawings, in which:

DETAILED DESCRIPTION OF PREFERRED EMBODIMENTS

Figure 1:
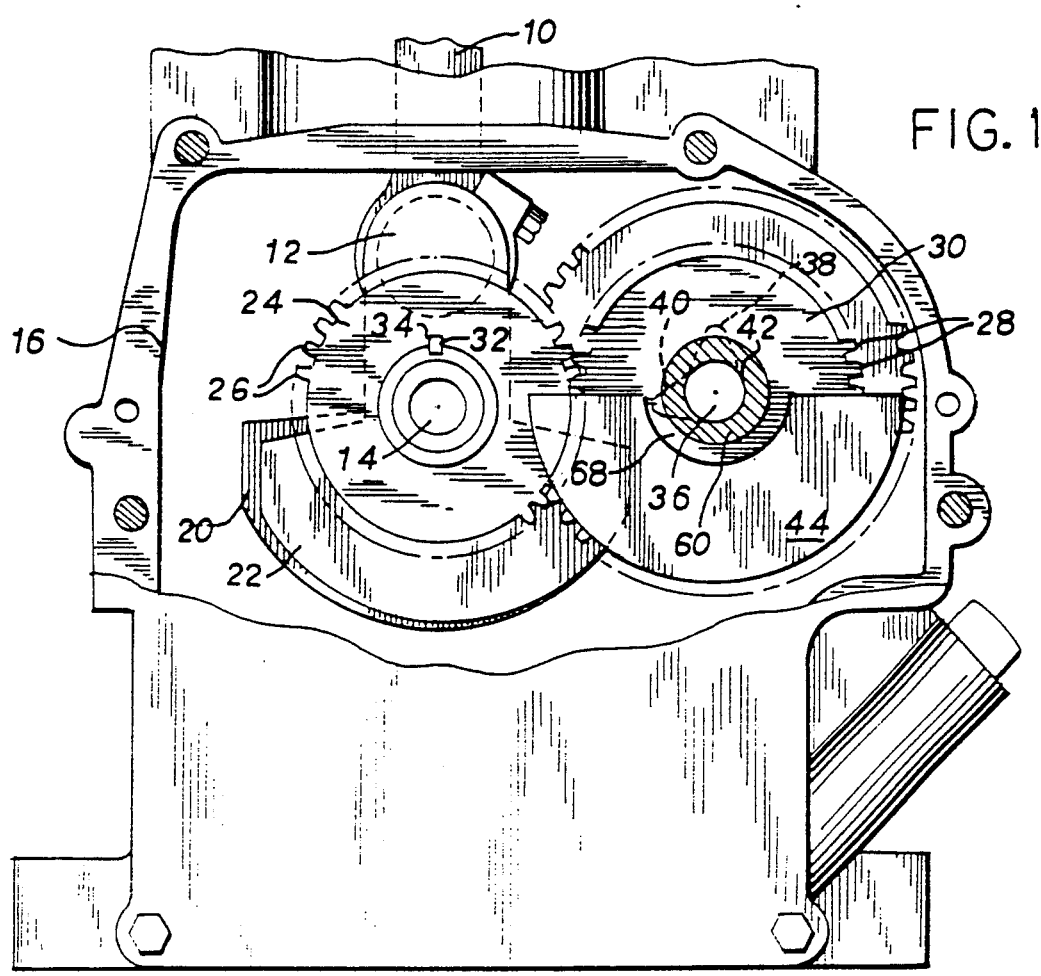
FIG. 1 is a side view, shown in partial section, of an engine incorporating the balancing system according to the present invention.

FIG. 1 is a side view shown in partial section of an internal combustion engine incorporating the balancing system according to the present invention. Although a single cylinder, horizontal shaft engine is depicted and described in connection with FIG. 1 and the other drawings, the invention may be used with multi-cylinder engines and with vertical shaft engines.

In FIG. 1, piston connecting rod 10 is connected to a crank pin 12 which in turn is affixed to the crankshaft 14. The entire balancing system is disposed in an engine crankcase 16 having a plurality of side walls, including a lower side wall 18 (FIGS. 2-5).

In FIG. 1, counterweights 20 and 22 attached to crankshaft 14 partially balance the reciprocating forces of the piston and the rotational forces of crank pin 12. Also attached to crankshaft 14 is a drive gear 24 having teeth 26 on its periphery which engage teeth 28 on the periphery of a driven gear 30. Drive gear 24 is affixed to crankshaft 14 and rotates therewith. One method of affixing the drive gear to the crankshaft is by means of a pin 32 attached to crankshaft 14 which engages a keyway 34 in drive gear 24.

Driven gear 30 is disposed on camshaft 36, but is freely and independently rotatable from camshaft 36. Camshaft 36 also has cams 38 and 40 that may be used to control the opening and closing of the piston's intake and exhaust valves.

A friction-reducing member 42 is affixed to the inner surface of driven gear 30 to reduce the friction between the driven gear and camshaft 36. Member 42 may be made from a variety of materials including compositions of Teflon and bronze, or from metal alloys that include copper or aluminum. One suitable bearing for member 42 is a bearing sold by Garlock under the trademark DU. However, any friction-reducing member may be used, although it is preferable to use one which does not require lubrication.

A counterbalance weight 44 is attached to driven gear 30 and is preferably formed integral therewith. Counterbalance weight 44 is preferably crescent-shaped, whose radius is substantially similar to the radius of driven gear 30. Although other shapes may be used for counterbalance weight 44, the crescent shape is particularly desirable since it at most tends a 18020 arc.

The thickness of counterbalance weight 44 is dependent upon the desired mass of the weight. Although the optimal mass of the weight should be empirically determined, it has been found that for a single cylinder engine having a three inch bore by a two and three-quarter inch stroke, where the drive and the driven gear both have diameters of two and one-half inches, the counterbalance weight preferably has a mass of about three hundred fifty-five grams.

Figure 2:
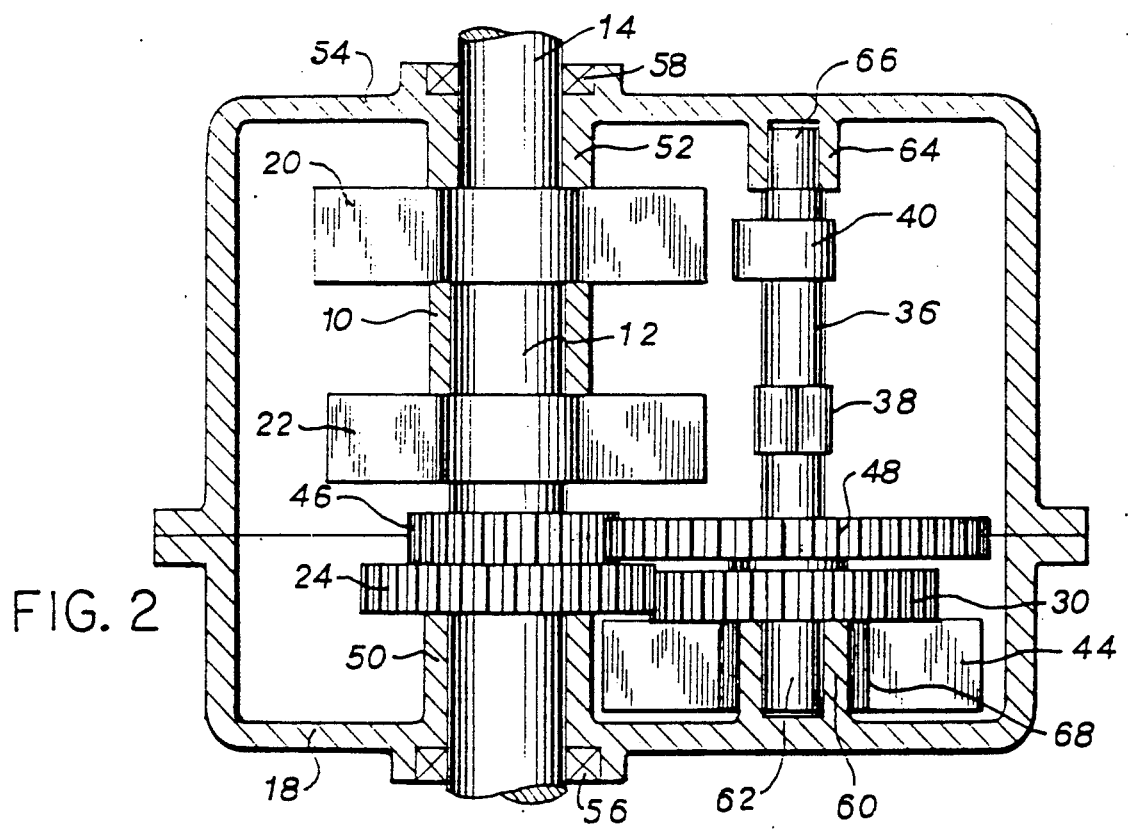
FIG. 2 is a top view of a first embodiment of the balancing system according to the present invention.

Several key advantages of the present invention are apparent from FIGS. 1 and 2 as well as the other figures. First, no additional shafts are required for the balancing system according to the present invention. Only the crankshaft and the camshaft are necessary. This results in a savings in parts and assembly costs of up to 50 per cent when compared with prior art balancing systems.

A second key advantage of the present invention is that driven gear 30 rotates at the same speed as drive gear 24 and also of crankshaft 14. This advantage is due to the fact that driven gear 30 is independently rotatable from camshaft 36. In typical balancing systems wherein the counterbalance weight is either geared to or attached to the camshaft, the counterbalance weight must rotate at the same speed as the camshaft, which is typically one-half the speed of the crankshaft.

Yet a third advantage of the present invention is that the counterbalance weight and driven gear 30 rotate in the opposite direction from crankshaft 14 and drive gear 24. In short, counterbalance weight 44 rotates at the same speed and in the opposite direction from crankshaft 14, and thus achieves a more effective balancing of the vibrational forces than achieved by prior art balancing systems.

Another key advantage of the present invention is that the present balancing system may be used in existing engine crankcases without significantly enlarging or otherwise modifying the engine housing. Several prior art balancing systems require that the crankshaft be extended to accommodate the balancing system, thereby further increasing the cost and complexity of the engine.

The balancing system according to the present invention may be used on engines having a wide variety of applications, including commercial engines, generators and pumps, as well as on leaf blowers, lawnmowers, snowblowers and the like.

FIG. 2 is a top view of the counterbalancing system depicted in FIG. 1. In FIG. 2, timing gear 46 affixed to crankshaft 14 engages a cam gear 48 affixed to camshaft 36. Timing gear 46 rotates with crankshaft 14, and cam gear 48 rotates with camshaft 36. Timing gear 46 is in meshing engagement with cam gear 48, causing cam gear 48 and thus camshaft 36 to rotate with crankshaft 14. The diameters of timing gear 46 and cam gear 48 are chosen such that cam gear 48 and thus camshaft 36 rotate at one-half the speed of crankshaft 14.

As shown in FIG. 2, crankshaft 14 is disposed within a crankshaft boss 50 that is attached to and extends from crankcase side wall 18. Crankshaft boss 50 also retains drive gear 24 and timing gear 46 in their proper positions. Similarly, a second crankshaft boss 52 is attached to and extends from crankcase side wall 54. Seals 56 and 58 prevent oil from leaking out of the crankcase to the environment.

Camshaft 36 may also be retained and disposed in a plurality of bosses. Specifically, camshaft boss 60 is attached to and extends from crankcase side wall 18. Boss 60 is designed to accept a first end 62 of camshaft 36. Similarly, a camshaft boss 64 is attached to and extends from crankcase side wall 54. Boss 64 is designed to accept a second end 66 of camshaft 36 that is disposed and rotatable in the boss. In the embodiments depicted in FIGS. 2-4, counterweight 44 rotates about camshaft boss 60 but is spaced apart from boss 60 by a space 68.

Figure 3:
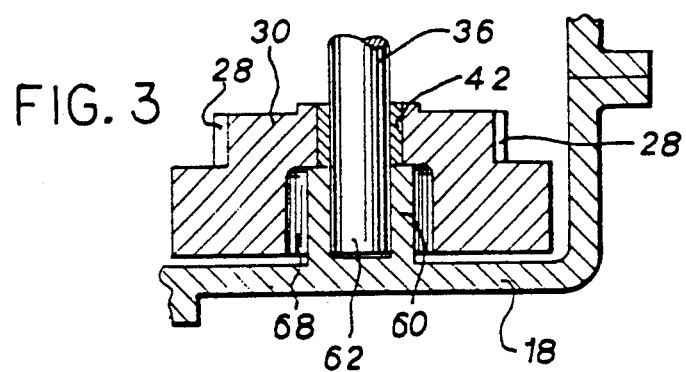
FIG. 3 depicts a cross-sectional view of the counterbalance weight of FIG. 2.

FIG. 3 is a cross-sectional view of driven gear 30 and counterbalance weight 44 where gear 30 and weight 44 are integrally formed. In FIG. 3, driven gear 30 having teeth 28 is integral with counterbalance weight 44. Driven gear 30 has attached thereto a friction-reducing member 42 as discussed above. Driven gear 30 and weight 44 are preferably integrally-formed to reduce manufacturing costs. If gear 30 and weight 44 are not integral, they may be connected by a pin and slot arrangement as is well known in the art.

Figure 4:
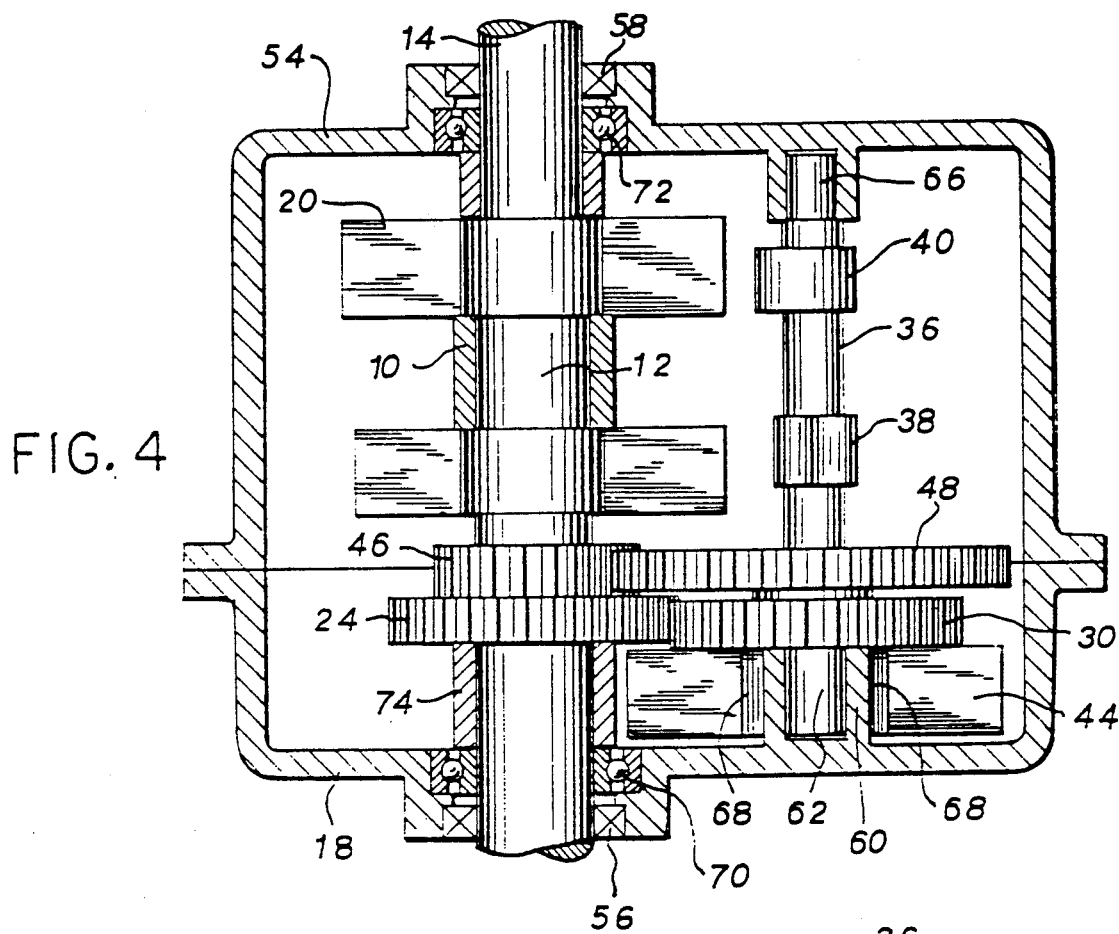
FIG. 4 is a top view of a second embodiment of the present invention.

FIG. 4 depicts a second embodiment of the present invention. In FIG. 4, as in all of the figures, components having corresponding functions have been given the same numerical designations.

Figure 5:
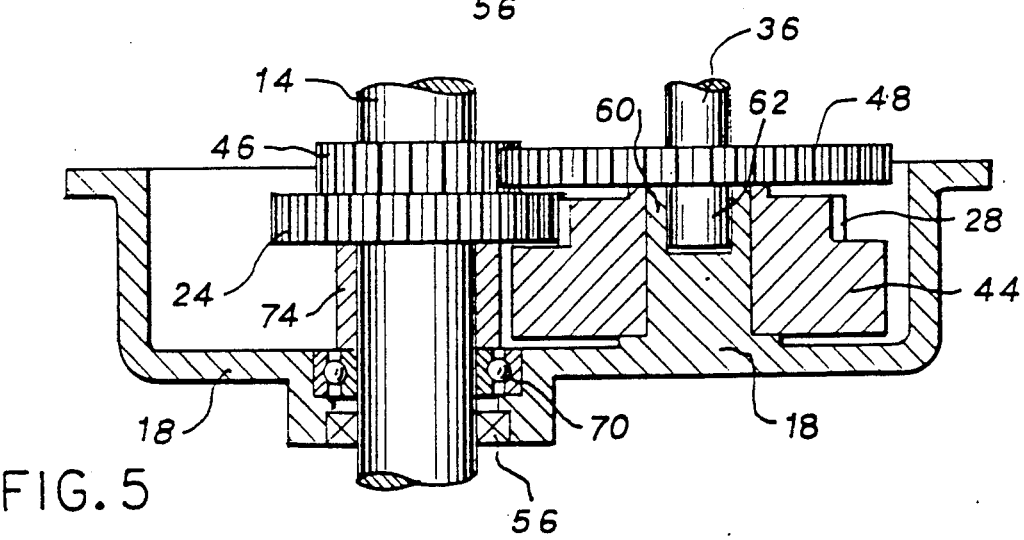
FIG. 5 depicts a third embodiment of the present invention in which the counterbalance weight rotates about the camshaft boss, but is not spaced from the camshaft boss as in the embodiments depicted in FIGS. 2-4.

The embodiments depicted in FIGS. 4 and 5 are preferred in vertical-shaft engines since oil from the crankcase is available to lubricate ball bearing assemblies 70 and 72. Ball-bearing assembly 70 is disposed in lower crankcase side wall 18, whereas ball-bearing assembly 72 is disposed in upper crankcase side wall 54. Both ball-bearing assemblies substantially surround crankshaft 14 and provide a friction-reducing surface that engages the crankshaft. Either or both of ball-bearing assemblies 70 and 72 may be eliminated or replaced by another friction-reducing member such as that used for member 42.

Assuming that lower ball-bearing assembly 70 is used, a spacer 74 should also be used to retain the relative positions of drive gear 24 and timing gear 46. Spacer 74 preferably encircles crankshaft 14 and is disposed between side wall 18 and drive gear 24.

In the embodiment depicted in FIG. 4, counterbalance weight 44 is spaced apart from camshaft boss 60 by a space 68. The balancing system in FIG. 4, as in all the figures, operates in substantially the same manner as discussed above in connection with FIGS. 1 and 2.

FIG. 5 depicts a third embodiment of the present invention. The primary difference between the embodiment depicted in FIG. 5 and that depicted in FIG. 4 is that in FIG. 5, counterweight 44 is not spaced apart from boss 60 as in FIGS. 2-4. In all the embodiments, however, counterbalance weight 44 rotates about camshaft boss 60. Of course, counterbalance weight 44 could just as easily rotate about camshaft 36.

Although particular preferred embodiments have been shown and described, other alternate embodiments will be apparent to those skilled in the art and are within the intended scope of the present invention. Therefore, the invention is to be limited only by the following claims.

We claim:

1. In an engine having a rotatable camshaft and a cylinder in which a piston reciprocates, the piston being connected to a rotatable crankshaft mounted in a crankcase having a side wall, improved counterbalancing means comprising:
    a drive gear disposed on and rotatable with said crankshaft;
    a driven gear in meshing engagement with said drive gear and rotatable with said drive gear, said driven gear being disposed on said camshaft and being independently rotatable from said camshaft; and
    a counterbalance weight interconnected with said driven gear and rotatable therewith, said counterbalance weight being independently rotatable from said camshaft.

2. The engine according to claim 1, wherein said driven gear is integral with said counterbalance weight.

3. The engine according to claim 1, further comprising:
    a friction-reducing member attached to said driven gear that substantially encircles said camshaft.

4. The engine according to claim 3, wherein said friction-reducing member is made from a material containing Teflon.

5. The engine according to claim 3, wherein said friction-reducing member is made from a material containing a metal alloy.

6. The engine according to claim 1, further comprising:
    a camshaft boss that extends from said crankcase side wall and that accepts an end of said camshaft, said counterbalance weight being rotatable about said boss 7. The engine according to claim 6, wherein said counterbalance weight is spaced from said camshaft boss.

8. The engine according to claim 1, further comprising:
    a timing gear disposed on said crankshaft and rotatable therewith, said timing gear being interconnected with said drive gear; and
    a cam gear in meshing engagement with said timing gear and rotatable therewith, said cam gear being interconnected with said camshaft.

9. The engine according to claim 1, wherein said counterbalance weight is substantially crescentshaped.

10. The engine according to claim 1, wherein said driven gear rotates at substantially the same speed as said crankshaft.

11. The engine according to claim 1, wherein said driven gear and said counterbalance weight rotate at the same speed as said drive gear, and in the opposite direction from said drive gear.

12. The engine according to claim 1, further comprising:
    a spacer disposed on said crankshaft between said drive gear and said crankshaft side wall.

13. The engine according to claim 12, further comprising:
    a bearing adjacent said spacer and substantially encircling said crankshaft.

14. The engine according to claim 1, further comprising:
    a crankshaft boss that extends from said crankcase side wall to said drive gear and that substantially encircles a portion of said crankshaft.

* * * * *